United States Patent
Hidaka et al.

(10) Patent No.: US 7,677,414 B2
(45) Date of Patent: Mar. 16, 2010

(54) DEVICE FOR APPLYING FOAMED HOT MELT ADHESIVE, AND METHOD FOR SELECTIVELY APPLYING FOAMED HOT MELT ADHESIVE AND SOLID HOT MELT ADHESIVE

(75) Inventors: Shoji Hidaka, Osaka (JP); Hiroki Iwase, Osaka (JP)

(73) Assignee: Suntool Corporation, Osaka (JP)

( * ) Notice: Subject to any disclaimer, the term of this patent is extended or adjusted under 35 U.S.C. 154(b) by 779 days.

(21) Appl. No.: 10/579,848

(22) PCT Filed: Nov. 22, 2004

(86) PCT No.: PCT/JP2004/017673
§ 371 (c)(1),
(2), (4) Date: May 17, 2006

(87) PCT Pub. No.: WO2005/063403
PCT Pub. Date: Jul. 14, 2005

(65) Prior Publication Data
US 2007/0090130 A1 Apr. 26, 2007

(30) Foreign Application Priority Data
Nov. 21, 2003 (JP) ............................. 2003-391837

(51) Int. Cl.
*B67D 5/58* (2006.01)
(52) U.S. Cl. .............. 222/190; 222/1; 222/52; 222/63; 222/135; 222/145.5; 222/145.6; 222/146.2; 222/255; 222/318
(58) Field of Classification Search ............... 222/190, 222/52, 50, 135, 138, 318, 137, 1, 63, 145.5, 222/145.6, 146.2, 252, 255, 146.5
See application file for complete search history.

(56) References Cited
U.S. PATENT DOCUMENTS
4,200,207 A * 4/1980 Akers et al. ............... 222/190

(Continued)

FOREIGN PATENT DOCUMENTS
JP 53-17645 2/1978

(Continued)

*Primary Examiner*—Frederick C. Nicolas
(74) *Attorney, Agent, or Firm*—William L. Androlia; H. Henry Koda

(57) ABSTRACT

In application of a foamed hot melt adhesive, a mixing ratio of foam can be selectably and quickly set, and also application of a foamed hot melt adhesive and that of a solid hot melt adhesive can be selectively performed by a single application device. A first gear pump and a second gear pump are driven by drive mechanisms independent from each other. The pressure of a liquid being sent by the pressure in the second compression process is detected, and this causes the speed of the first gear pump and the second gear pump to be sequence-controlled to automatically control the amount of mixing of gas. A gas suction opening is provided between the first gear pump and the second gear pump, and a mixer is provided between the gas suction opening and the second gear pump. The end of a return circuit is set on the downstream side of the first gear pump to prevent foam from returning to the tank side. A restriction valve is installed in a gun to produce a single bubble. The ratio of discharges between the first gear pump and the second gear pump is automatically controlled and set at a value greater than 1/1, enabling solid hot melt adhesive application and foamed hot melt application to be selectively performed.

3 Claims, 3 Drawing Sheets

U.S. PATENT DOCUMENTS

| | | | | |
|---|---|---|---|---|
| 4,527,712 A | * | 7/1985 | Cobbs et al. | 222/1 |
| 4,535,919 A | * | 8/1985 | Jameson | 222/190 |
| 4,779,762 A | * | 10/1988 | Klein et al. | 222/52 |
| 5,407,132 A | * | 4/1995 | Messerly et al. | 239/124 |
| 5,533,675 A | * | 7/1996 | Benecke et al. | 239/413 |
| 5,683,036 A | * | 11/1997 | Benecke et al. | 239/413 |
| 5,685,911 A | * | 11/1997 | Raterman et al. | 118/669 |
| 6,131,770 A | * | 10/2000 | Allen | 222/55 |
| 6,538,040 B1 | * | 3/2003 | Okuda et al. | 516/10 |
| 6,607,104 B2 | * | 8/2003 | McGuffey | 222/318 |

FOREIGN PATENT DOCUMENTS

| | | |
|---|---|---|
| JP | 63-77568 | 4/1988 |
| JP | 2-218465 | 8/1990 |

\* cited by examiner

| foam | good | bad |
|---|---|---|
| condition | single foam<br>P →<br>even foam,<br>fine foam | continuos foam<br>Q →<br>uneven foam<br>rough foam/<br>enlarged foam |

DEVICE FOR APPLYING FOAMED HOT MELT ADHESIVE, AND METHOD FOR SELECTIVELY APPLYING FOAMED HOT MELT ADHESIVE AND SOLID HOT MELT ADHESIVE

BACKGROUND OF THE INVENTION

1. Field of the Invention

The present invention relates to a device for applying a foamed hot melt adhesive, and more specifically, the present invention relates to a device for applying the foamed hot melt adhesive for applying a foamed hot melt adhesive in which air bubbles are mixed by mixing gas in a solution of the hot melt adhesive.

2. Description of the Related Art

With respect to this kind of a device for applying a foamed hot melt adhesive having air bubbles mixed therein and a method for selectively applying a foamed hot melt adhesive having air bubbles mixed therein, JP-B-60-3350 (Japanese Patent Application No. 52-91500, Japanese Patent No. 1380841, "device for manufacturing hot melt heating plasticity adhesive foam") is publicly known.

The publicly-known art according to the above-described JP-B-60-3350 includes a hot melt adhesive compression process using a first gear pump 101 with reference to FIG. 4 and a gas mixing process using a second gear pump 102 and discloses the art to discharge a gas mixed hot melt adhesive from a front end of a nozzle 103 and make the gas mixed hot melt adhesive into a foam condition under instantaneously an atmosphere pressure.

According to the above-described conventional art, the first gear pump and the second gear pump are driven by a single drive mechanism to make the both gear pumps into the same capacity so as to generate a negative pressure in a pressure-feed process of two stages and mix gas in the hot melt adhesive.

In this case, a gear ratio is constant, so that it is necessary to always regulate a gas supplied quantity in order to gear the control of increase and decrease of the mixed air bubbles to the supplied quantity of the consumed hot melt adhesive. In other words, if the ratio of a ratio of a supply capacity of the both pumps is made larger (namely, the negative pressure is made larger), the air bubbles become too big and this involves a problem such that the bubbles may burst or may be crushed by the atmosphere pressure after they are discharged. On the contrary, if the ratio is made smaller, this involves a problem such that it takes a long tome to mix the air bubbles.

A right capacity ratio of the pumps is about 1:1.5, however, according to the above-described conventional art, the first gear pump and the second gear pump are integrated and are driven on the same axis, so that it is not possible to control the value of the forced negative pressure by rotation frequencies of the pumps. The inlet quantity of the supplied gas is limited. In order to maintain the mixing rate of the gas immediately in line with the discharge quantity of the gas, it takes a long time. Further, this involves a problem such that the condition for making the optimum and fine air bubbles quickly cannot be obtained.

SUMMARY OF THE INVENTION

The present invention has been made taking the foregoing problems into consideration and an object of the present invention is to selectively, quickly, and easily set the ratio of mixing of the air bubbles.

In addition, another object of the present invention is to provide a method for selectively applying a foamed hot melt adhesive fir selectively performing a foamed hot melt application and a solid hot melt application (namely, 100% liquid hot melt adhesive application without air bubbles) by using the device for applying the foamed hot melt adhesive.

The invention 1 of the present application may provide a device for applying a foamed hot melt adhesive having a first compression process including a first gear pump and a second compression process including a second gear pump, supplying a hot melt adhesive with application of pressure in the first compression processing, mixing a gas with the a hot melt adhesive in the second compression process, and discharging the foamed hot melt adhesive from a discharge opening, wherein the first gear pump of the first compression process and the second gear pump of the second compression process are driven by drive mechanisms independently from each other and rotation frequencies of the first gear pump and the second gear pump, respectively, are set independently and arbitrarily, and detecting a pressure of a liquid (a hot melt adhesive) being pressure fed in the second compression process, the rotation frequencies of the first gear pump and the second gear pump, respectively, are sequentially controlled so as to automatically control an amount of the gas to be mixed.

According to the invention 2 of the present application, a gas suction opening is provided between the first gear pump and the second gear pump in the second compression process and a mixer is provided between the gas suction opening and the second gear pump so as to enhance mixture and dispersion between the gas and a liquid, and an end of a return circuit in the second compression process is located at a downstream of the first gear pump so as to prevent air bubbles from returning to a tank, namely, between the first gear pump and the gas suction opening, so as to prevent air bubbles from returning to a tank.

According to the invention 3 of the present application, a gun installs a valve mechanism and a restriction valve therein so as to produce a single bubble.

According to the invention 4 of the present application, a method for selectively applying a foamed hot melt adhesive and a solid hot melt adhesive using the device for applying a foam hot melt adhesive according to the invention 1, the ratio of discharge between the first gear pump and the second gear pump is automatically controlled to be set at 1/1 to apply the solid hot melt adhesive, the ratio of discharge between the first gear pump and the second gear pump is automatically controlled to be set at a value greater than 1/1 to apply the foamed hot melt adhesive, and application of the foamed hot melt adhesive and that of the solid hot melt adhesive can be selectively performed by the device for applying the foamed hot melt adhesive.

DESCRIPTION OF THE PREFERRED EMBODIMENTS

Figure 1:
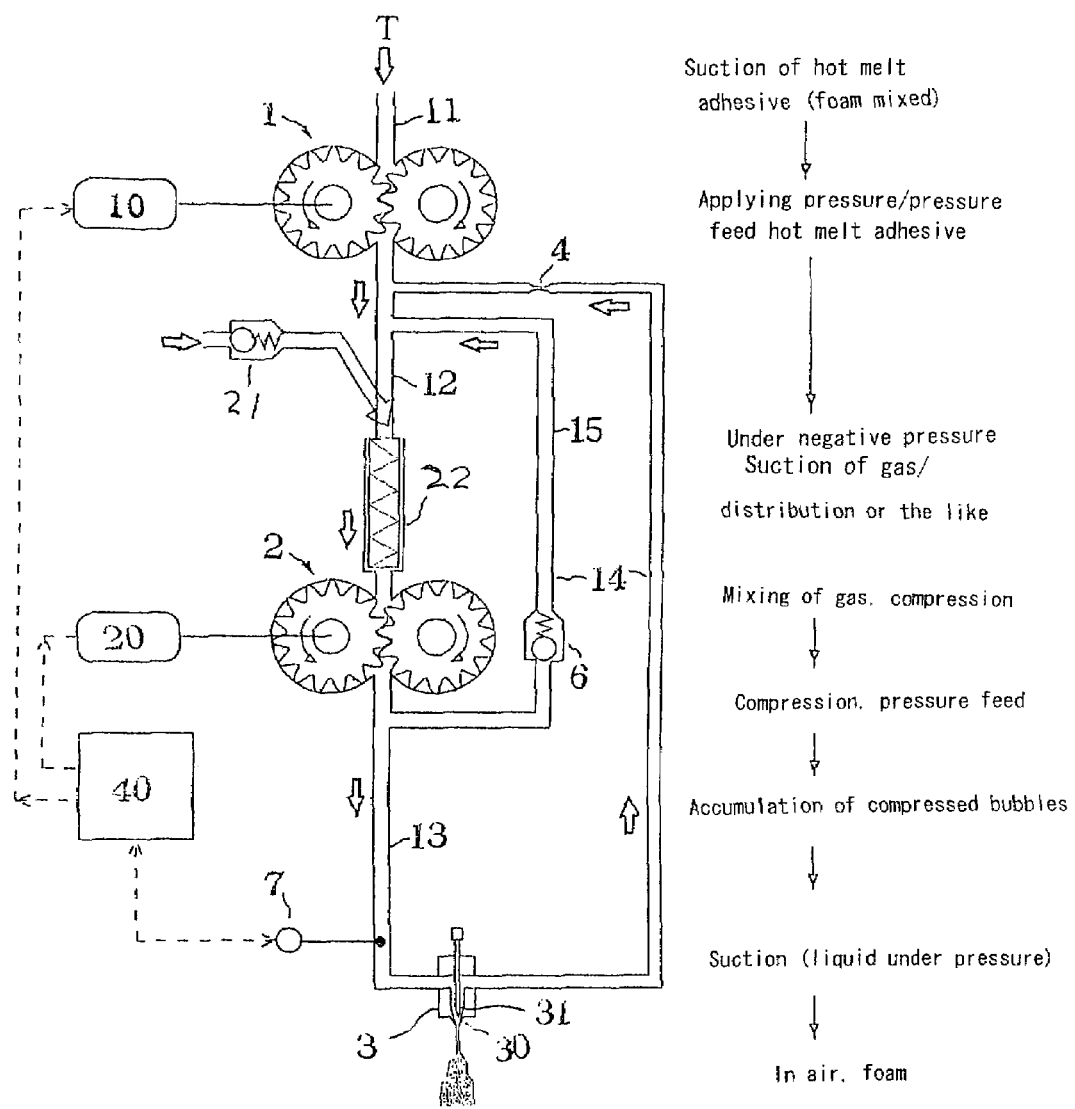
FIG. 1 is a block diagram showing the outline of a device for applying a foamed hot melt adhesive in which air bubbles are mixed according to an embodiment of the present invention.

In a device for applying a foamed hot melt adhesive having a first compression process including a first gear pump and a second compression process including a second gear pump, pressurizing and supplying a hot melt adhesive in the first compression processing, mixing gas in the second compression process, and discharging the foamed hot melt adhesive from a discharge opening, the first gear pump of the first compression process and the second gear pump of the second compression process are driven by drive mechanisms independently from each other.

A gas suction opening is provided between the first gear pump and the second gear pump in the second compression process and a mixer is provided between the gas suction opening and the second gear pump.

Detecting the pressure of the liquid (the hot melt adhesive) being sent by the pressure in the second compression process and sequence-controlling rotation frequencies of the first gear pump and the second gear pump, respectively, the ratio of mixing of gas is automatically controlled.

An end of a return circuit in the second compression process is located at the downstream side of the first gear pump, namely, between the first gear pump and the gas suction opening.

A gun installs a valve mechanism and a restriction valve therein.

A control part may automatically control the set value of the ratio of discharge between the first gear pump and the second gear pump by sequence control to make the ratio of discharge into 1 so as to enable the solid hot melt adhesive application, and the control part may automatically control the set value of the ratio of discharge between the first gear pump and the second gear pump at an arbitrary set value greater than 1 so as to enable the foamed hot melt adhesive application.

A First Compression Process:

The liquid (the hot melt adhesive in a molten condition) supplied from a melting system (a tank) is sent by pressure to the second compression process by the first gear pump.

A Second Compression Process:

The pump capacity of the second gear pump is larger than that of the first gear pump, so that a negative pressure condition is formed at the side of downstream of the first gear pump. The gas is supplied to the liquid (the hot melt adhesive in the molten condition) in the negative pressure condition.

A mixer may mix and blend the liquid (the hot melt adhesive in the molten condition) with the gas.

The second gear pump may compress the mixture of the gas and the liquid and may feed it by pressure.

The compressed air bubbles are accumulated between a gun and the second gear pump.

The gun installs a valve mechanism therein and has a restriction valve and this leads to the fact that the mixture of the gas and the liquid to be discharged by the nozzle becomes instantaneously in a foam condition when it is discharged into air.

At the downstream side of the second compression process, detecting the pressure of the liquid (the hot melt adhesive) being sent by the pressure and sequence-controlling the rotation frequencies of the first gear pump and the second gear pump, respectively, by using a microcomputer, the ratio of mixing of gas is automatically controlled.

EMBODIMENT(S)

In order to explain the present invention in detail, with reference to the embodiment(s) shown in the attached drawings, the present invention will be described in detail.

Figures 2, 3:
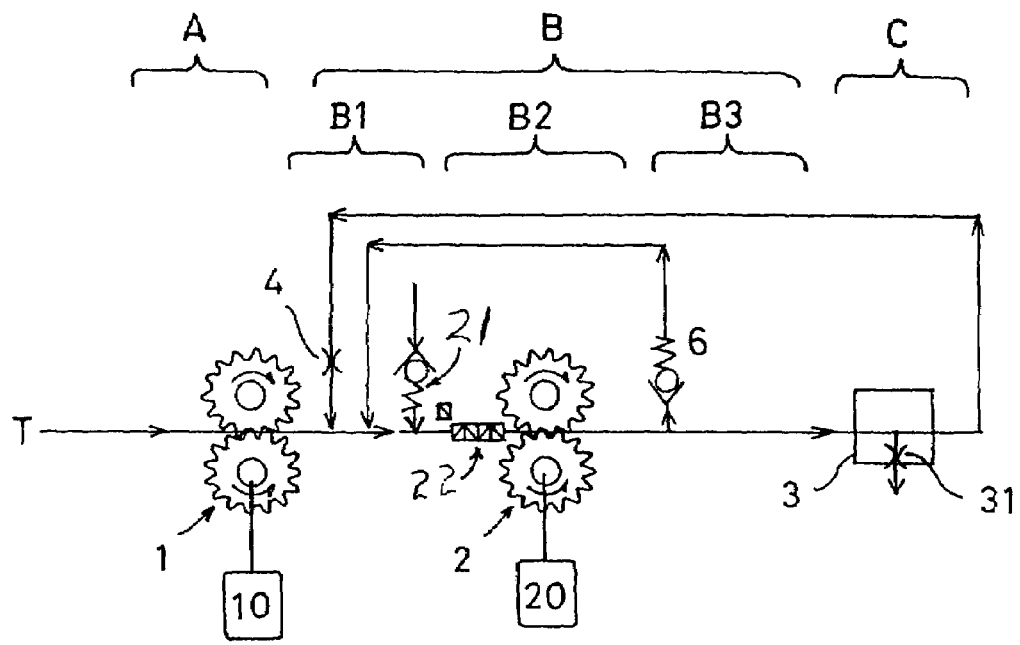
FIG. 2 is an operation explanatory view showing each process according to the embodiment of the present invention.
FIG. 3 is an explanatory view showing a difference between continuous foam and single foam.
Figure 4:
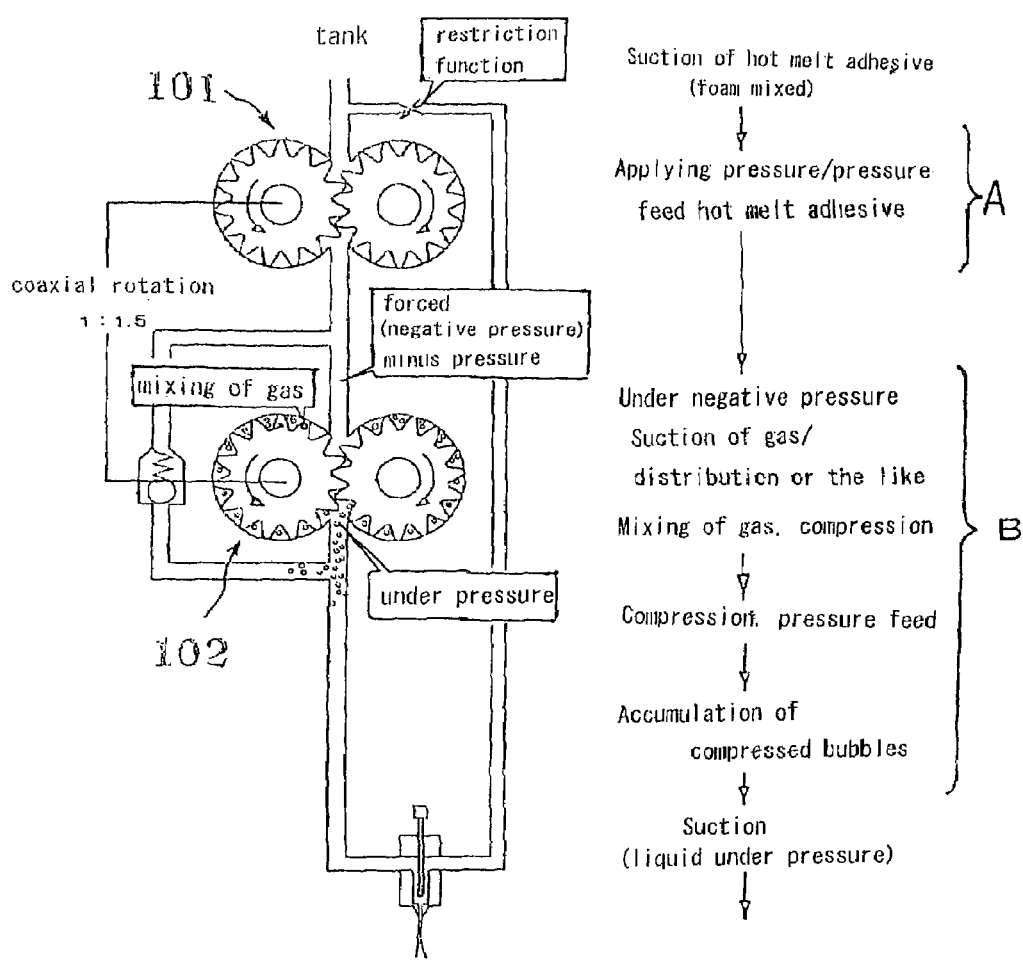
FIG. 4 is a block diagram showing the outline of a publicly-known device for applying a foamed hot melt adhesive in which air bubbles are mixed, which is the same as FIG. 1.

With reference to FIG. 1 and FIG. 2, at a first compression process A including the first gear pump 1, it is the same as the publicly-known system that the first gear pump 1 is mounted on a first line (a liquid supply pipe) 11 communicating with a supply source (a tank) T of the liquid (the molten hot melt adhesive).

At a second compression process B, according to the present invention, a gas supply and mix process B1 is added at the upstream side of a process of compressing and sending by pressure B2 due to the second gear pump 2.

In the gas supply and mix process B1, a gas suction opening 21 is provided on a second line (pipe) 12 that is connected to the second gear pump 2 being continued to the first gear pump 1, and further, a mixer 22 is provided between the gas suction opening 21 and the second gear pump 2 to enhance mixture and dispersion between the gas and the liquid (the hot melt adhesive). A reference numeral 5 denotes a check valve that is put between a gas source (N2 gas) and the gas suction opening 21.

By sending the mixture of the gas and the liquid by pressure using a third line (pressure sending horse) 13 to connect the second gear pump 2 to an application gun unit 3, the compressed air bubbles are accumulated to configure a compressed air bubble accumulating process 3.

A gun 3 located at an end of the third line (pressure sending horse) 13 may have a valve mechanism and may install a restriction valve 31 in the vicinity of a nozzle (a discharge opening) 30 at its front end so as to discharge the mixture of the gas and the liquid including the compressed air bubbles from the nozzle (the discharge opening) 30.

Providing a first drive mechanism (an electric pulse motor controlled by a microcomputer) 10 with respect to the first gear pump 1 in the first compression process A and providing a second drive mechanism (an electric pulse motor controlled by a microcomputer) 20 with respect to the second gear pump 2 in the second compression process B, the first gear pump 1 of the first compression process A and the second gear pump 2 of the second compression process B are driven independently each other and the rotation frequencies of the first gear pump and the second gear pump, respectively, are set independently and arbitrarily.

With reference to FIG. 1, the end of a return circuit (a fourth line) 14 near the gun 3 is set at the front portion (the downstream side of the first gear pump) of the second line 12. At the end of the return circuit (a fourth line) 14, a restriction valve 4 is provided.

A second return circuit (a fifth line) 15 is provided between the front end of the third line 13 and the upstream side of the gas suction opening 21 of the second line 12. On the second return circuit (the fifth line) 15, a relief valve 6 is provided.

At the front end of the return circuit (the fourth line) 14 and in the vicinity of the gun 3, a liquid pressure detecting sensor 7 is disposed. A micro computer 40 is provided, which sequence-controls the rotation frequencies of the first gear pump and the second gear pump, respectively, by controlling the first drive mechanism (the electric pulse motor controlled by a microcomputer) 10 with respect to the first gear pump 1 and providing the second drive mechanism (the electric pulse motor controlled by a microcomputer) 20 with respect to the second gear pump 2 due to the detection input of this liquid pressure detecting sensor 7.

In the meantime, according to the example(s), the first line 11 and the second line 12 are formed integrated with the first gear pump 1 and the second gear pump 2. In other words, they are formed by a manifold (8 to 13 mm Φ) formed within a metal block configuring the first gear pump 1 and the second gear pump 2. The third line 13 and the forth line 14 are horses of 8 to 13 mm Φ and the length of (the third line 13+the fourth line 14) is in the range of 3 to 20 m.

With reference to FIG. 2, the operation of the present invention will be described below.

A First Compression Process A:

The liquid (the hot melt adhesive in the molten condition) supplied from the melting system (the tank) T is sent by pressure to the second compression process by the first gear pump.

A Second Compression Process B:

When the pump capacity of the second gear pump is larger than that of the first gear pump, the negative pressure condition is formed at the side of downstream of the first gear pump by sequence-controlling the rotation frequencies of the first gear pump and the second gear pump, respectively, by a micro computer.

In a Gas Supply and Mix Process B1:

At the gas suction opening 21 of the second line (the pipe) 12, gas (the N2 gas) is sucked from the gas source (the N2 gas) into the gas suction opening 21. After that, a mixer 22 may enhance mixture and dispersion between the gas and the liquid (the hot melt adhesive).

In a Gas Compression Process B2:

The gear pump 2 may pressurize the mixture of the gas and the liquid and may sent it by pressure (in other words, a large amount of fine gas is compressed and enclosed in the pressured liquid).

In the Line 13

The air bubbles are accumulated between a nozzle 3 and the second gear pump 2.

A Discharge Process C:

The mixture of the gas and the liquid is discharged from the discharge opening 30 of the nozzle 3. Then, the mixture of the gas and the liquid discharged to air becomes instantaneously in the foam condition and the foamed hot melt adhesive is applied.

In the system, the foamed hot melt adhesive is a 100% liquid hot melt adhesive (gas is compressed by the 100% liquid hot melt adhesive to be scattered), however, the liquid is made into the foam condition by air pressure after it is discharged from the nozzle (with reference to FIG. 3, it is a single foam P and it is not a continuous foam Q). In the meantime, sometimes, the gas is mixed in a condition of a fine bubble and the liquid ratio is slightly lower than 100%.

In the next place, the examples of numeric values of a sequence control according to the second invention will be listed below.

A pressure value of the liquid (the hot melt adhesive) being set by pressure in the second compression process: 30 kgf per cm²

Rotation frequency of the first gear pump: 0 to 100 RPM (20 cc/rev)

Rotation frequency of the second gear pump: 0 to 150 RPM (40 cc/rev)

Supplied quantity of the liquid (the hot melt adhesive): 0 to 2,000 cc/min

Gas mixing quantity: 0% to 75%

Foam mixing ratio: till three times (different depending on a capability of the hot melt adhesive)

Then, a sixth invention will be described below.

[Application of a Foamed Hot Melt Adhesive]

The device is operated with a gear pump ratio of discharge set at a value greater than 1.

On the condition that the capacity of the first pump is set at 1 cc/rev, the capacity of the second pump is set at 3 cc/rev, and the gear pump ratio of discharge is set at two times, if the rotation frequency of the first pump is 10 rpm, the device is controlled so that the second pump rotates at the rotation frequency 6.6 rpm.

Then, the first pump: 1 cc×10 rpm=10 cc/min and the second pump: 3 cc×6.66 rpm=20 cc/min are obtained, and the insufficient 10 cc/min is filled by nitrogen gas and the foam magnifying power is made into two times.

If the pressure is made into a set value, the first pump is stopped and if it is made into a value lower than the set value, the first pump is rotated to control the pressure.

Examples of Combination

First pump: 1 cc, second pump: 3 cc, rotation ratio: 1 to 3 times, pressure: 1 to 4 MPa First pump: 3 cc, second pump: 6 cc, rotation ratio: 1 to 3 times, pressure: 1 to 4 MPa First pump: 10 cc, second pump: 25 cc, rotation ratio: 1 to 3 times, pressure: 1 to 4 MPa First pump: 20 cc, second pump: 40 cc, rotation ratio: 1 to 3 times, pressure: 1 to 4 MPa

[Application of Solid Hot Melt Adhesive]

With the ratio of discharge of the gear pump made into 1/1, the first pump and the second pump are automatically controlled by sequence-control so that the pressure in the circuit is made into a target pressure (a set value with in the above-described range of 1 to 4 MPa).

The above sequence-controlling can be applied the PID computer-control (P: Proportion action, I: Integral calculus action, D: Differential action) by the control of the microcomputer.

The first invention of the present application has advantages, for example, by setting the rotation frequencies of the first gear pump and the second gear pump, respectively, independently and arbitrarily, upon the foamed (air bubbles are mixed) hot melt application, the amount of mixing of the air bubble is arbitrarily decided by selecting the rotation frequency of the second pump; further, by detecting the pressure of the liquid (the hot melt adhesive agent) being sent by pressure and sequence-controlling the rotation frequencies of the first gear pump and the second gear pump, respectively, to automatically control the amount of mixing of the gas, the sequence control requiring no regulation to mix the optimum amount of the gas that is troublesome and takes a long time is installed and the optimum amount of the air bubbles can be automatically mixed; and still further, the foam magnifying power can be set rapidly and the set foam magnifying power can be automatically maintained.

The second invention of the present application according to the first invention has an advantage such that the time to mix the gas can be made shorter by providing the gas suction opening and the mixer at the upstream side of the second gear pump in the second compression process to enhance mixture and dispersion between the gas and the liquid (the hot melt adhesive) and idling time of starting the manufacture can be made shorter. Further, when the end of the return circuit in the second compression process is located at the downstream side of the first gear pump, the air bubbles are prevented from returning to the tank side and no air bubble returns to the melting system (the tank). As a result, the amount of application is stable (if the liquid having the air bubbles is sucked by the first pump, the amount of application is unstable) and further, the melting time in the melting system can be faster (if the air bubble return to the tank, the foams are not cleared and the melt liquid in the tank maintains the foams as they are, so that when melting the liquid again, the present second invention has an advantage to prevent consumption of air energy of the foams and the wasting time.

The present third invention has an advantage such that approximately even air bubbles can be finely distributed not as a continuous foam Q but as a single foam P since the restriction valve is provided at the gun at the end of the system in addition to the valve mechanism.

According to the fourth invention, it is possible to further select the function as the device for applying the solid hot melt adhesive that applies the liquid not including the air bubble 100% when the ratio of discharge is defined as 1 under the sequence control of the microcomputer PID control, namely, that performs the application of the solid hot mail adhesive in addition to the function as the device for applying the foamed hot melt adhesive such that the device for applying the single foamed hot melt adhesive controls the ratio of discharge to the value greater than 1 to perform the application of the foamed hot melt adhesive, and the present fourth invention has an advantage to enable the two kinds of application formations to be treated by a single system.

According to the present invention, in application of the foamed hot melt adhesive, the mixing ratio of foam can be selectively and quickly set, and also application of the foamed hot melt adhesive and that of the solid hot melt adhesive (application of the 100% hot melt adhesive without air bubbles) can be selectively performed, so that the preferable application of the hot melt adhesive corresponding to various kinds of the application base materials can be performed. Therefore, the present invention is effective for enhancing the usage of the hot melt adhesive.

What is claimed is:

1. A device for applying a foamed hot melt adhesive having a first compression process including a first gear pump and a second compression process including a second gear pump, supplying a hot melt adhesive with application of pressure in the first compression process, mixing a gas with the hot melt adhesive in the second compression process, and discharging the foamed hot melt adhesive from a discharge opening,
   wherein the first gear pump of the first compression process and the second gear pump of the second compression process are driven by drive mechanisms independently from each other and rotation frequencies of the first gear pump and the second gear pump, respectively, are set independently and arbitrarily, and
   a gas suction opening is provided between the first gear pump and the second gear pump in the second compression process and a mixer is provided between the gas suction opening and the second gear pump so as to enhance mixture and dispersion between the gas and a liquid, and
   an end of a return circuit in the second compression process is located at a downstream of the first gear pump so as to prevent air bubbles from returning to a tank.

2. A device for applying a foamed hot melt adhesive having a first compression process including a first gear pump and a second compression process including a second gear pump, supplying a hot melt adhesive with application of pressure in the first compression process, mixing a gas with the hot melt adhesive in the second compression process, and discharging the foamed hot melt adhesive from a discharge opening,
   wherein the first gear pump of the first compression process and the second gear pump of the second compression process are driven by drive mechanisms independently from each other and rotation frequencies of the first gear pump and the second gear pump, respectively, are set independently and arbitrarily, and
   a gas suction opening is provided between the first gear pump and the second gear pump in the second compression process and a mixer is provided between the gas suction opening and the second gear pump so as to enhance mixture and dispersion between the gas and a liquid, and wherein:
   said discharge opening is provided in a gun, and
   a valve mechanism comprising a restriction valve is provided in said gun adjacent said discharge opening so as to produce a single bubble.

3. A method for selectively applying a foamed hot melt adhesive and a solid hot melt adhesive, using a device for applying a foam hot melt adhesive having a first compression process including a first gear pump and a second compression process including a second gear pump, supplying a hot melt adhesive with application of pressure in the first compression process, mixing a gas with the hot melt adhesive in the second compression process, and discharging the foamed hot melt adhesive from a discharge opening, the first gear pump of the first compression process and the second gear pump of the second compression process being driven by drive mechanisms independently from each other and rotation frequencies of the first gear pump being the second gear pump, respectively, are set independently and arbitrarily,
   wherein the ratio of discharge between the first gear pump and the second gear pump is automatically controlled to be set at 1/1 to apply the solid hot melt adhesive,
   the ratio of discharge between the first gear pump and the second gear pump is automatically controlled to be set at a value greater than 1/1 to apply the foamed hot melt adhesive, and
   application of the foamed hot melt adhesive and that of the solid hot melt adhesive can be selectively performed by the device for applying the foamed hot melt adhesive.

* * * * *